US006757795B2

(12) United States Patent
Barri et al.

(10) Patent No.: US 6,757,795 B2
(45) Date of Patent: Jun. 29, 2004

(54) APPARATUS AND METHOD FOR EFFICIENTLY SHARING MEMORY BANDWIDTH IN A NETWORK PROCESSOR

(75) Inventors: Peter I. A. Barri, Bonheiden (BE); Jean L. Calvignac, Cary, NC (US); Marco C. Heddes, Lawrence, MA (US); Joseph F. Logan, Raleigh, NC (US); Alex M. M. Niemegeers, Ghent (BE); Fabrice J. Verplanken, La Gaude (FR); Miroslav Vrana, Ghent (BE)

(73) Assignees: International Business Machines Corporation, Armonk, NY (US); Alcatel, Paris (FR)

( * ) Notice: Subject to any disclaimer, the term of this patent is extended or adjusted under 35 U.S.C. 154(b) by 223 days.

(21) Appl. No.: 10/068,392

(22) Filed: Feb. 5, 2002

(65) Prior Publication Data

US 2002/0141256 A1 Oct. 3, 2002

Related U.S. Application Data

(60) Provisional application No. 60/281,063, filed on Apr. 3, 2001.

(51) Int. Cl.[7] .............................................. G05F 12/00
(52) U.S. Cl. ..................................... 711/158; 711/173
(58) Field of Search .................................. 711/158, 173

(56) References Cited

U.S. PATENT DOCUMENTS

| | | | |
|---|---|---|---|
| 4,325,116 A | 4/1982 | Kranz et al. ................ 364/200 |
| 4,633,434 A | 12/1986 | Scheuneman ............... 364/900 |
| 4,761,736 A | 8/1988 | Di Orio ...................... 364/200 |
| 4,797,815 A | 1/1989 | Moore ......................... 364/200 |
| 5,034,914 A | 7/1991 | Osterlund ................... 361/900 |
| 5,212,666 A | 5/1993 | Takeda ....................... 365/230 |
| 5,559,953 A | 9/1996 | Seiler et al. ................. 395/164 |
| 5,581,310 A | 12/1996 | Vinekar et al. ............. 348/718 |
| 5,603,061 A | 2/1997 | Hilley et al. ................ 395/864 |
| 5,781,201 A | 7/1998 | McCormack et al. ....... 345/509 |
| 5,870,325 A | 2/1999 | Nielsen et al. ............... 365/63 |
| 5,907,863 A | 5/1999 | Bolyn ......................... 711/167 |
| 5,920,898 A | 7/1999 | Bolyn et al. ................ 711/167 |
| 5,966,143 A | 10/1999 | Breternitz, Jr. ............. 345/709 |
| 6,031,842 A | 2/2000 | Trevitt et al. ............... 370/412 |
| 6,078,515 A | 6/2000 | Nielsen et al. ............... 365/63 |

FOREIGN PATENT DOCUMENTS

EP 1059587 A1 12/2000 ........... G06F/13/18

OTHER PUBLICATIONS

Pending Patent application, P. Barri et al., "Systems and Method of Maintaining High Bandwidth Requirement of a Data Pipe from Low Bandwidth Memories", se. No. 09/990, 840, filed Nov. 21, 2001 (docket RAL920000112US2).

*Primary Examiner*—Kevin Verbrugge
(74) *Attorney, Agent, or Firm*—Joscelyn G. Cockburn

(57) ABSTRACT

A Network Processor (NP) includes a controller that allows maximum utilization of the memory. The controller includes a memory arbiter that monitors memory access requests from requesters in the NP and awards high priority requesters all the memory bandwidth requested per access to the memory. If the memory bandwidth requested by the high priority requester is less than the full memory bandwidth, the difference between the requested bandwidth and full memory bandwidth is assigned to lower priority requesters. By so doing every memory access utilizes the full memory bandwidth.

31 Claims, 7 Drawing Sheets

APPARATUS AND METHOD FOR EFFICIENTLY SHARING MEMORY BANDWIDTH IN A NETWORK PROCESSOR

The present application claims priority of the Provisional Application Ser. No. 60/281,063, filed Apr. 3, 2001.

CROSS-REFERENCE TO RELATED PATENT APPLICATIONS

The present invention relates to patent application Ser. No. 09/990,840, entitled "SYSTEM AND METHOD OF MAINTAINING HIGH BANDWIDTH REQUIREMENT OF A DATA PIPE FROM LOW BANDWIDTH MEMORIES", filed Nov. 21, 2001, by P. Barri et al. is co-assigned to the assignee of the present invention and is incorporated herein by reference.

BACKGROUND OF THE INVENTION a) Field Of the Invention

The present invention relates to computers and network processors in general and in particular to memory systems to be used with said computers and network processors.

b) Prior Art

The use of network devices such as switches, bridges, computers, network processors etc., for transferring information within communications network is well known in the prior art. One of the requirements placed on these devices is the need for them to transport large volumes of data often referred to as bandwidth.

To meet the high bandwidth requirement the devices are provided with Clear Channels. A Clear Channel is a channel with high bandwidth which transmits large amounts of data on a single flow, as opposed to channelized links which carry several lower bandwidth data flows on a single physical link.

In order to provide Clear Channels with ample supply of data, high speed storage subsystems are required. High speed storage systems such as Static Random Access Memories (SRAM) etc., can be used to meet high bandwidth requirements. But these memories are expensive and as a result increase the price of the devices in which they are used. The cost problem is further worsened if such high price memories were to be used to build storage systems for computers and Network Processors.

In addition to being expensive, the prior art high speed memories are low density. They can only store a limited amount of data. However, most applications especially those related to internet and other technologies require high density memories or storage systems. As a consequence even the prior art high speed memories are not suitable for many applications.

In view of the above there is a need for high speed memories that are low cost and have high densities. As used in this document high speed memories have large Bandwidth (BW) providing large amounts of data in a relatively short time interval. The invention described herein provides such a storage.

SUMMARY OF THE INVENTION

The invention includes methods that optimize utilization of a memory system by the resources using said memory system. In particular, the requests, read or write, from multiple requesters are bundled so that for each memory access cycle the maximum allowable unit of information is read or written. By so doing the information throughput is enhanced thereby allowing the use of relatively low cost, high density relatively slow access time memories, such as DDR DRAM, to be used to build storage for computer Network Processors or similar devices.

The requesters include the Receiver Controller, Embedded Processor Complex (EPC) Controller and Transmitter Controller in a Network Processor or like devices. The memory system includes a plurality of buffers, formed from DDR DRAM modules, which are arranged into groups termed "slices". Each DDR DRAM is partitioned into a plurality of buffers (1 through N) and is controlled by a DRAM controller. Each Buffer is partitioned into sections termed "Quadwords". In one embodiment the Buffer is partitioned in Quadwords A, B, C, D. Both the buffer and Quadwords in the buffer are addressable.

A memory arbiter monitors requests from the Receiver Controller, EPC Controller and Transmitter Controller. The memory arbiter uses the requests to form Memory Access Vector per slice of memory. For read requests, memory access priority is given to the Transmitter Controller. If the request from the Transmitter Controller requires full memory bandwidth, the Memory Access Vector is based upon the Transmitter Controller Request only. If less than full memory bandwidth is required, by the Transmitter Controller, any pending read requests by the EPC Controller is merged with that from the Transmitter Controller to form the memory access vector per slice. The DRAM Controller in response to the memory access vector output a full buffer of information containing data for the Transmitter Controller (if a full buffer of data has been requested) or data for the Transmitter Controller and EPC (if transmitter had requested less than full buffer). In essence any excess capacity, resulting from the Transmitter Controller requesting less than a full buffer of data, is allocated to the EPC Controller.

For Write Request, the Arbiter gives priority to the Receiver Controller. In a similar manner, any write requests in which the Receiver Controller has less than a full buffer payload is augmented with data from the EPC.

As a consequence a full buffer of data is always written or read on each memory access.

DETAILED DESCRIPTION OF THE PREFERRED EMBODIMENT

Figure 1A:
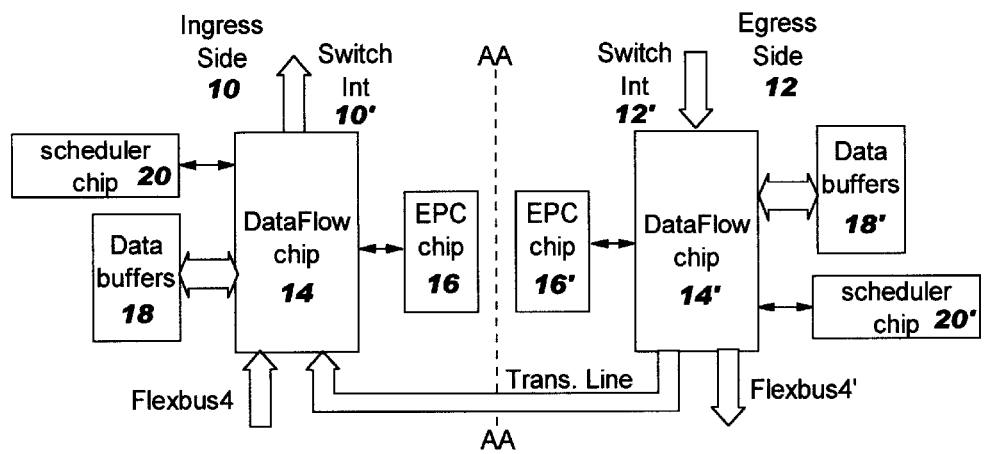
FIG. 1A shows a block diagram of a Network Processor in which the present invention is used.

FIG. 1A shows a block diagram of a network processor (NP) in which the present invention set forth below is implemented. The network processor includes an Ingress Side 10 and an Egress Side 12. The Ingress Side 10 and Egress Side 12 are symmetrical about the imaginary axis AA. Data traffic accessing the Ingress Side 10 enters on Flexbus 4 or the WRAP transmission line and exits on Switch Interface 10'. Likewise, data entering Egress Side 12 enters on Switch Interface 12' and exits on the Conductor labelled Flexbus 4'. The Flexbusses 4, 4' and Switch Interfaces (Int) 10', 12' could be considered as Clear Channels delivering 10 Gbps and 14 Gbps, respectively. The Switch Interface 10' is coupled to Switch Interface 12' by a switch assembly (not shown) such as Prizma developed and marketed by IBM.

Still referring to FIG. 1A, the Ingress Side 10 includes data flow chip 14, EPC chip 16, data buffers 18 and scheduler chip 20. The Egress Side 12 includes data flow chip 14', EPC chip 16', data buffers 18' and scheduler chip 20'. A WRAP transmission line interconnects data flow chip 14' to data flow chip 14. The named components are interconnected as shown in the figure. It should be noted that elements with like names in the figure are substantially similar and the description of one covers the description of the other. By way of example, EPC chip 16 and EPC chip 16' are substantially identical. Likewise, components with similar names are also identical.

The configuration shown in FIG. 1A provides bidirectional functionality. A packet walk through the chipset will be used to explain its functionality. An HDLC frame extracted from Sonet/SDH stream by a framer device (not shown) is received on Flexbus 4 (Ingress side) and forwarded into data flow chip 14. The data from the frame is written into data buffers 18. Once a complete frame has been written in the data buffers 18, the frame context (FCB) is enqueued into one of the EPC (Embedded Processor Complex) queues (G-FIFO in FIG. 1B). The EPC chip 16 reads out the frame pointers and processes the respective frame in one of its picoprocessors. During frame processing EPC can issue requests for reading/writing the appropriate parts of the frame (e.g. L2 and L3 headers) from/into the data buffer. After frame processing is completed, EPC passes the frame context to data flow chip which enqueues the frame into the queueing structure of the scheduler chip 20. The scheduler in scheduler chip 20 selects the frame from appropriate queue for transmission which means that corresponding frame pointer is passed to data flow chip. The transmitted frame is read out from data buffer and is transmitted on switch interface 10' in the form of PRIZMA cells. PRIZMA cells are sixty-four bytes cells carrying segments of variable-size frames, or complete Asynchronous Transfer Mode (ATM) cells. The cells are fed over switch interface 10' into a cross point switch (not shown). In a preferred embodiment the cross point switch is a product named PRIZMA manufactured and marketed by International Business Machines Corporation®.

Still referring to FIG. 1A, in the Egress direction, Egress Side 12, PRIZMA cells are received on switch interface 12' and forwarded to data buffers 18'. After receiving complete frame the frame pointer is enqueued for processing in EPC queues. Egress EPC 16' retrieves the frame context from the data flow chip and processes the frame header in the picocode running in the EPC picoprocessors (not shown). The result of the processing is the frame context, which is passed to data flow chip 14' and is enqueued in appropriate queue of the scheduler 20'. The scheduler in scheduler chip 20' selects the frame to be transmitted. The frame is then read out from the data buffer 18' and transmitted on line labelled Flexbus 4' of data flow chip 14'. For brevity, only the portion of the network processor that is relevant to applicants' invention will be discussed further.

Figure 1B:
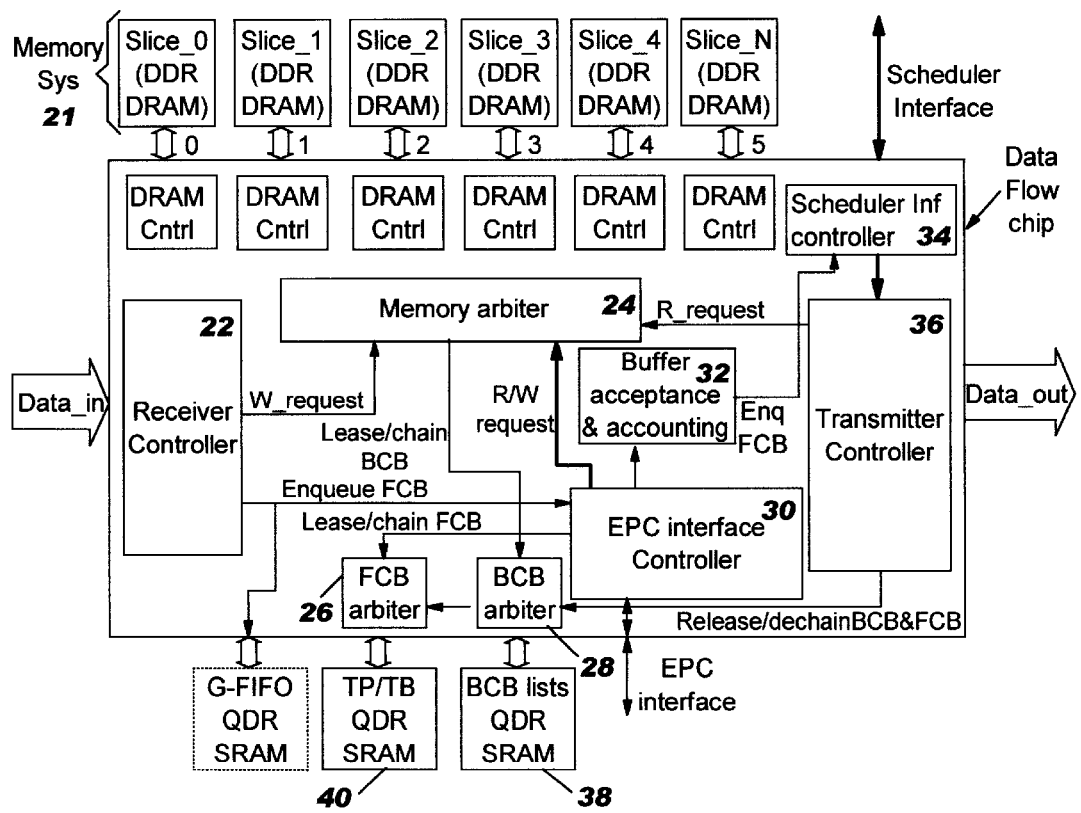
FIG. 1B shows a block diagram of Network Processor Requesters and memory system according to teachings of the present invention.

FIG. 1B shows a block diagram of the data flow chip and memory system (Sys) 21 according to the teachings of the present invention. Data into the data flow chip is provided on the bus labelled Data_in and data out of the chip is transmitted on the bus labelled Data_out. As stated previously Data_and Data_out are Clear Channels transmitting large amounts of data. The memory system 21 is made up of a plurality of DDR DRAM termed, slice 0 through slice N. In the embodiment shown in 1B, N=5. As will be explained below, each slice is made up of a plurality of buffers and are connected by individual bus 0–5 to separate DRAM controller in the data flow chip. The DRAM controller is a conventional DRAM controller and provides write, read, refresh and other functions to the slice which they service. Because DRAM Controllers are well known within the art they will not be discussed further.

Still referring to FIG. 1B, the functional blocks in the data flow chip includes Receiver Controller 22, Memory arbiter 24, FCB arbiter 26, BCB arbiter 28, EPC controller 30, Buffer acceptance and accounting 32, scheduler interface controller 34, and transmitter controller 36. The QDR SRAM 38 stores a list of buffers that are in memory system 21. QDR SRAM 40 stores information relative to frames in the target blade (T/B) and target port (TP) queues. The memory arbiter 24 interfaces the data flow chip to the memory system 21. To this end the memory arbiter collects read (R)/write (W) requests from transmitter, receiver and embedded processor complex (EPC) controllers 22, 36 and 38, and schedules access towards individual data store memory slice. As will be explained subsequently, each memory slice includes a plurality of buffers, each buffer being 64 bytes. It should be noted that other size bandwidth of data can be designed without departing from the teachings of the present invention. Frame data are then written into different buffers spread over different slices of memory in order to maximize use of memory bandwidth. When reading data from memory, the data is pulled out in 64 bytes. Stated another way, the bandwidth going into or out of memory is 64 bytes. It should be noted that other size bandwidth of data can be designed without departing from the teachings of the present invention. The memory arbiter according to the teachings of the invention makes sure that any access to the memory (Read or Write) has a payload of 64 bytes. If a request, from a requester, has less than 64 bytes, the payload is augmented by data from another requester.

Still referring to FIG. 1B, receiver controller 22 receives data from incoming bus labelled Data_in and issues write requests in order to write receive data into individual buffers in memory system 21. Likewise, transmitter controller 36 issues read requests in order to transmit selected frames on bus labelled DATA OUT. The EPC controller 30 terminates different messages from/to EPC and issues read/write requests to data store (memory system 21). It also maintains track of frame waiting (G-FIFOs) before processing. The buffer acceptance and accounting block 32 is responsible for enqueue/discard decision on per frame basis. It also maintains queue-filling level on TB/TP basis and provides this information to the switch fabric on switch interface. BCB and FCB memory arbiters provide scheduling of different accesses for link lists operation such as chain/dechain FCB or BCB, lease/release FCB or BCB.

Figure 2:
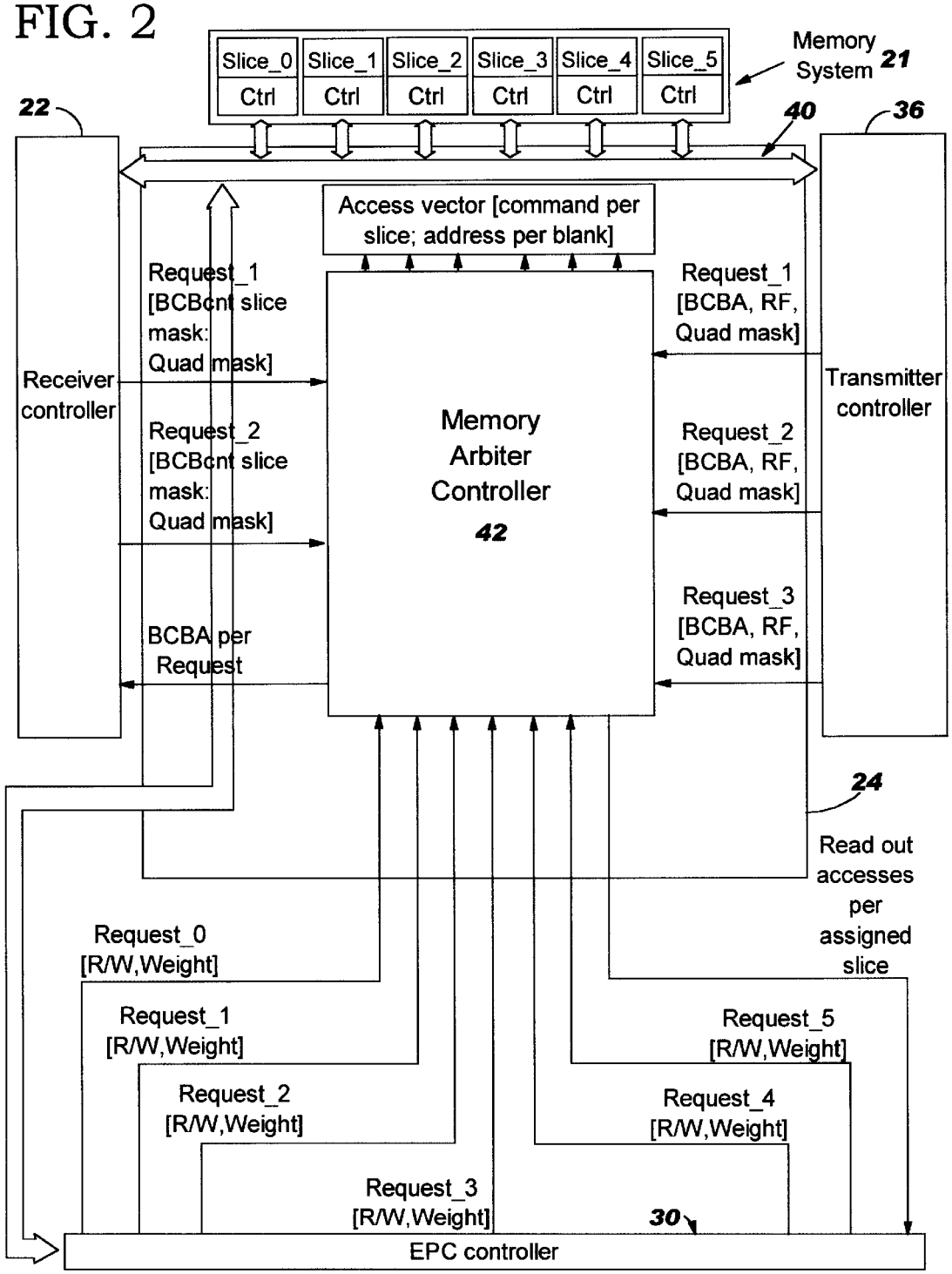
FIG. 2 shows a block diagram of the memory arbiter according to the teachings of the present invention.

FIG. 2 shows a functional block diagram of the memory arbiter according to the teachings of the present invention. The function of the memory arbiter is to provide access to memory system 21. The memory arbiter accepts requests from receiver controller 22, transmitter controller 36 and EPC controller 30. The requests are prioritized with the transmitter controller 36 having the highest priority, the receiver controller 22 the next highest priority and the EPC controller 30 the lowest. Of course different order or priorities may be selected without departing from the teachings of the present invention. In granting permission for access to the memory the arbiter makes sure that for each memory access the maximum bandwidth of data that is permitted by the memory is utilized. As a consequence, if the memory request is for reading data the request would be a read request from the transmitter controller 36 and/or the EPC controller 30. The memory arbiter analyzes the request from the transmitter controller; if the request requires the full memory bandwidth then the arbiter generates the access vector having a command per slice part and an address per bank part. The access vector would be delivered to the appropriate memory controller and the data is extracted from memory.

As explained herein, each buffer in the memory has 64 bytes partitioned into 4 Quadwords A, B, C and D with each Quadword having 16 bytes each. If the transmitter controller requires less than 4 Quadwords in any memory access, the unused amount of Quadword is given to the EPC controller. Any request for writing is issued by the receive controller and the EPC controller. Like the read request, all write requests require 4 Quadwords of information to be delivered to the memory controller. If the receiver controller writes less than 4 Quadwords the non-used Quadword is assigned to the EPC controller. As a consequence, every access to the memory writes or reads 4 Quadwords 64 bytes of data. By so doing, the maximum memory bandwidth is utilized with no room for waste cycles.

Still referring to FIG. 2, the memory arbiter includes a bus structure 40 interconnecting memory system 21, receiver controller 22, EPC controller 30 and transmitter controller 36. The receiver controller 22 interfaces the memory arbiter to the switch or line interface. The EPC controller interfaces the arbiter to the EPC chip (FIG. 1). The transmitter controller 36 interfaces the memory arbiter to Data_out bus (FIG. 1B). The arbiter includes memory arbiter controller 42 which receives the respective request shown in the figure generates the access vector which is supplied to respective controller to access individual slices in the memory system. The memory arbiter arbitration works in 11 cycle windows (one cycle equals 6 ns). At the start of the access window, memory arbiter receives the following inputs (request) to be scheduled in next window:

Transmitter Controller Request—represented by BCB address of the buffer to be read; RF flag indicating whether buffer can be released and Quadword mask complements each BCBA address. Quadword mask indicating which Quadwords within this buffer must be effectively read allows the memory arbiter to complement access for unused Quadwords with ones from EPC. In a preferred embodiment of this invention 0, 1, 2 or 3 requests can be made by the transmitter controller in one memory access window. The respective requests are shown by arrows interconnecting the transmitter controller 36 with memory arbiter controller 42. The direction of the arrow shows the direction in which the requests flow.

Receiver Controller Requests—represented by slice exclusion masks and two Quadword masks. Two Quadword masks indirectly indicate how many buffers need to be located per one request (e.g. if one of the Quadword masks is '0000' it means only one buffer shall be allocated) and which memory banks (Quadwords) should be used in different buffers. As stated previously, the receiver controller 22 has second highest priority to access memory. The requests allowed to the receiver controller are shown as arrows emanating from the receiver controller to the memory arbiter controller 42.

EPC Controller requests—represented by queues per slice, per action and per Quadword. Memory arbiter shall assign all remaining slices based on weight of individual Quadword requests. This weight is proportional to age of the Quadword request expressed by 6-bit value. Moreover, memory arbiters can complement accesses of transmitter and receiver by reading corresponding Quadword access requests from EPC requests queueing system. In a preferred embodiment of the invention the maximum number of Quadword accesses that EPC can be granted in one memory access window is limited to 8 read and 8 write Quadwords. The single headed arrow indicates information flow passing from the EPC controller and memory arbiter controller 42.

Still referring to FIG. 2 the memory arbiter controller 42 receives the request from the respective requesters (receiver controller 22, transmit controller 36 and EPC controller 30) generates access vector which is delivered to the appropriate slice controller (Ctrl) for reading or writing information from or into buffers in the selected slice. Excess bandwidth that is not utilized by the receiver controller or the transmitter controller is assigned to the EPC controller. As a consequence, all access to memory utilizes the full memory bandwidth. Based upon the input from the requester the memory arbiter controller 42 performs following slice selection algorithm in order to construct buffer memory access vector for next window:

Exclude slices scheduled for refresh cycle (indicated by each DRAM controller)

Assign slices for all R (Read) requests of transmitter controller

Complement R-accesses from corresponding EPC queue (slice: Quadword)

Assign slice to EPC for globally W (Write) excluded slices (slices excluded by all slice exclusion rules from receiver)

Assign slices to W requests in round robin (RR) fashion between non-excluded slice starting from last assigned slice (slice assigned to receiver controller in previous window)

Complement W-access by EPC access from corresponding EPC queue (slice: Quadword)

Assign slice to EPC requests according to priority expressed by weight.

The slice selection algorithm can be implemented in logic hardware or can be coded as microcode running in a picoprocessor. The selection of hardware logic or picocode to implement the above selection algorithm is a design of choice and is well within the skill of one skilled in the art given the algorithm set forth above.

Figure 6:
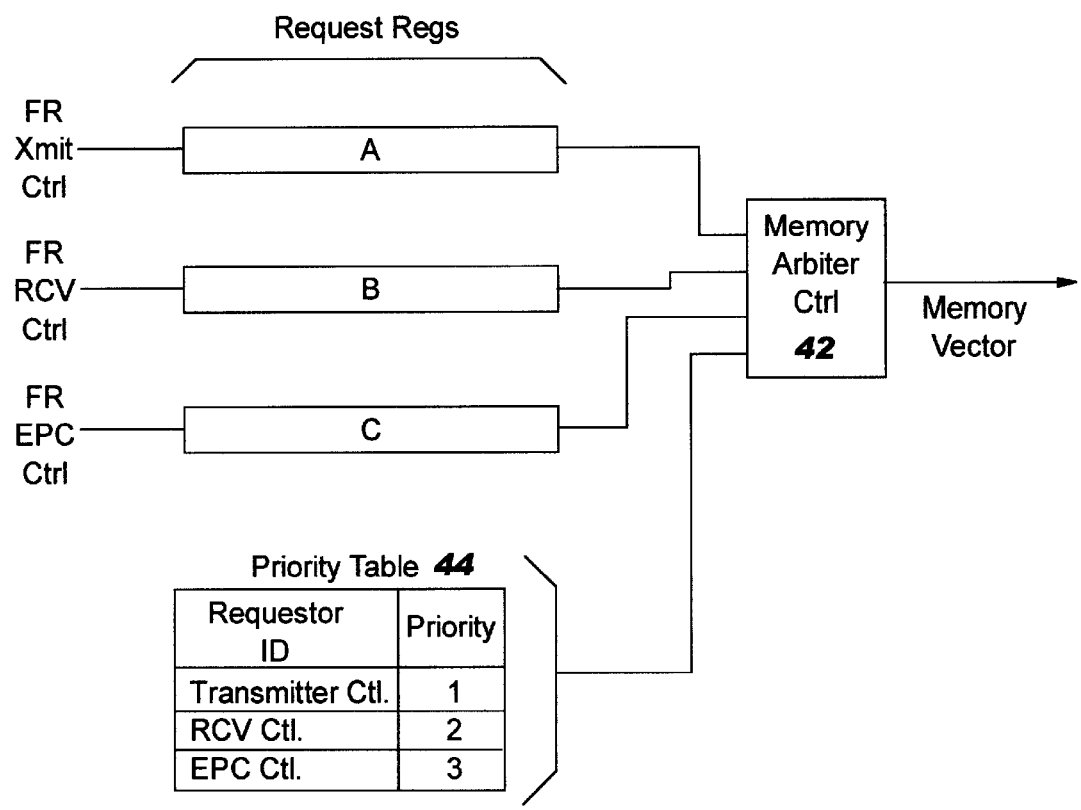
FIG. 6 shows an alternate embodiment of the memory arbiter.

Turning to FIG. 6 for the moment, an alternate embodiment for the memory arbiter is shown. The alternate memory arbiter includes memory arbiter controller (CTRL) 42 connected to request registers A, B, C and priority table 44. The request registers store requests from the respective requester. Request register A stores request from transmitter (XMIT) controller, request register B stores request from receiver (RECV) controller and register C stores requests from EPC controller. The priority table 44 stores a priority designation for each of the requesters. Thus, transmitter controller which has the highest priority is a 1, receiver controller the next highest priority 2, and the EPC controller with the lowest priority is a 3. In operation the memory arbiter controller is designed in accordance with the above select algorithm uses information in the register together with the priority level to generate the memory vector according to the teaching of the present invention.

Figure 3:
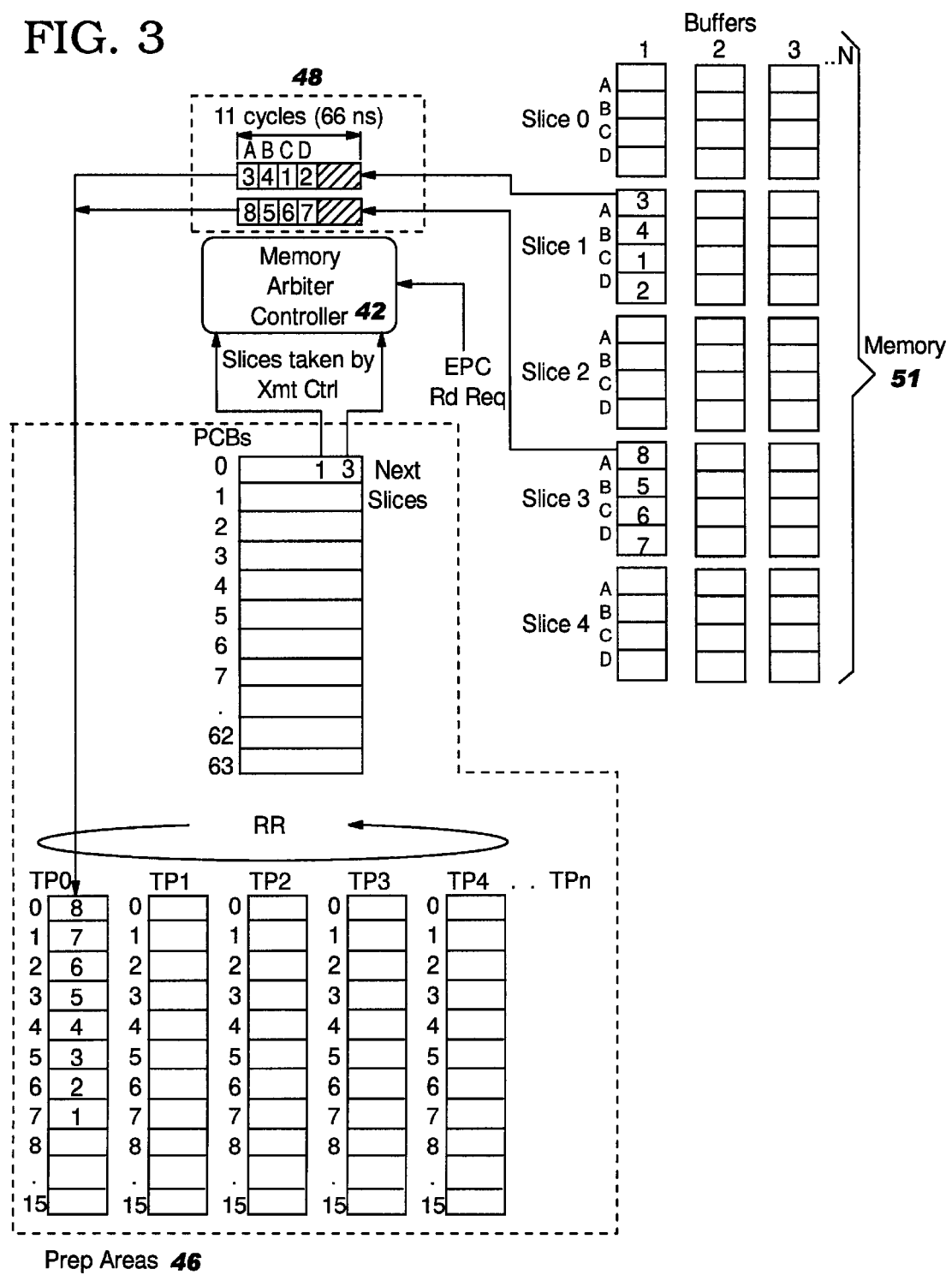
FIG. 3 shows a functional block diagram illustrating a read request in which the full bandwidth is used by the Transmitter Controller.
Figure 4:
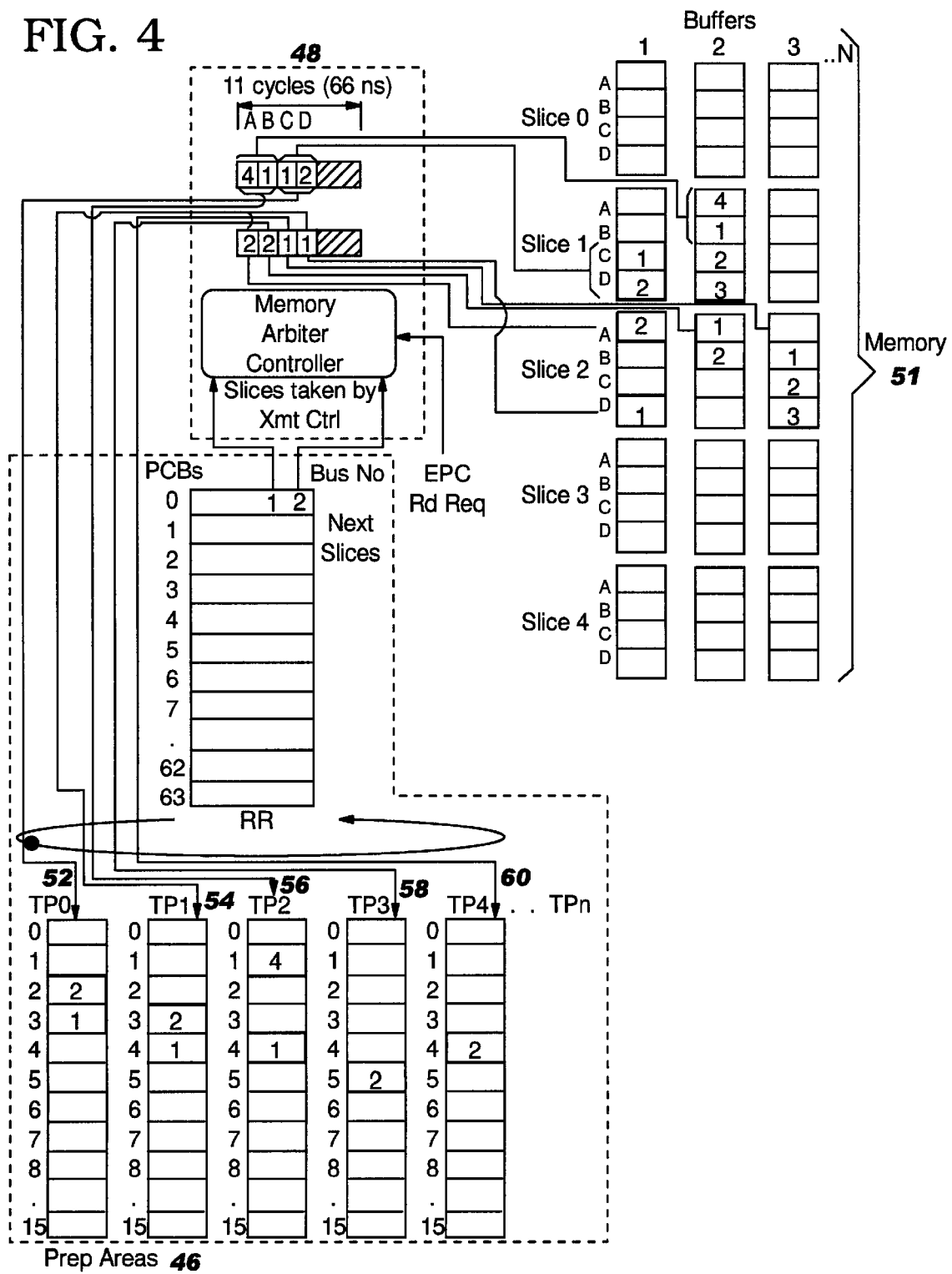
FIG. 4 shows a functional block diagram illustrating a Read Request in which different buffers from the same slice are accessed and assigned to different Target Port (TP) FIFO buffers. The Figure can also be used to illustrate a Write Request in which data would flow in the opposite direction.
Figure 5:
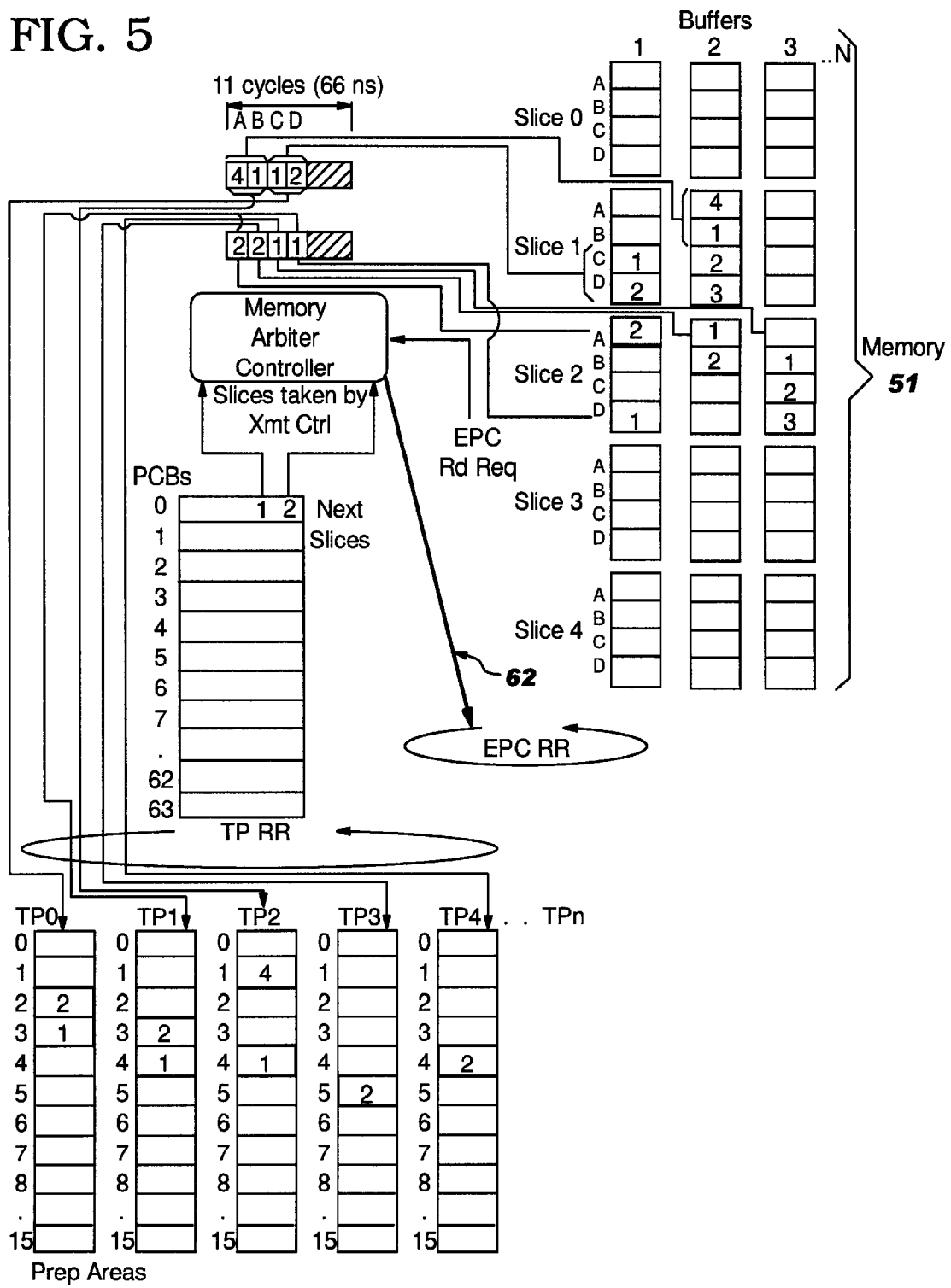
FIG. 5 shows a functional block diagram illustrating a Read Request in which different buffers from different slices are accessed and one Quadword is allotted to the EPC Controller.

FIGS. 3, 4 and 5 show examples which further explain the invention. In the figures the feature of utilizing full memory bandwidth when data is extracted or read from memory is demonstrated. The data in memory was written in earlier write cycles.

FIG. 3 shows a functional block diagram illustrating a read request in which the full bandwidth is used by the transmitter controller. As stated the transmitter controller has the highest priority for reading data from memory. The illustration includes memory 51, timing representation 48, memory arbiter controller 42, and preparation areas 46. Memory 51 includes a plurality of buffers arranged in sets termed slice. In the figure slice 0, 1, 2, 3 and 4 are shown. However, this should not be construed as a limitation since additional numbers or fewer slices can be used without departing from the teachings of the present invention. In addition, 3 buffers (labelled 1, 2 and 3) are shown in each slice. However, this should be construed as an example and not a limitation on the scope of the invention. The number of buffers that are used in a slice depends on the choice of the designer. As a consequence, the number of buffers in a slice are N, where N can be any number dependent on the designer's choice. As stated above, each of the buffers is 64 bytes partitioned into sectors termed Quadword A, B, C and D. Each of the Quadword is 16 bytes. Each slice is fabricated from a DDR DRAM module partitioned into N buffers. The showing of numerals in the buffer 1 means that slice 1 buffer 1 is filled with data containing Quadwords 3, 4, 1 and 2. Likewise, slice 3, buffer 1 is filled with data containing Quadwords 8, 5, 6 and 7. Each Quadword stores a double word (16 bytes). It should be noted other granularity could be selected without deviating from the teachings of the present invention. Quite likely this data was received in the receive controller 22 FIG. 1 and at a time earlier loaded or written into memory 51.

Still referring to FIG. 3, 48 shows the graphical representation of the timing of the transfer of the data removed from the storage and rearranged (rotate). The graphical representation has space for Quadword A, B, C and D. The memory access is 11 cycles approximately 66 nanoseconds. In each memory cycle two buffers in different memory slices can be accessed simultaneously. Memory arbiter 42 was previously discussed and will not be repeated in detail. Suffice it to say that it takes requests from the transmit controller and the EPC and arranges them so as to extract the requested information from memory 51.

Still referring to FIG. 3, preparation area 46 contains the resources that are necessary to manage data, remove from storage at the request of the transmitter controller 36 (FIG. 1B). The preparation area 46 includes port control blocks (PCBs), a set of target port buffers labelled TP 0, TP 1, TP 3, TP 4 . . . TP N. The number of TP (Target Port) buffers depends on the designer. Therefore, the showing of 5 should not be construed as a limitation of the invention. The close arrow label RR indicates round robin procedure whereby the buffers are filled or serviced in clockwise direction. The PCB contains a listing of buffers in the Preparation Area. In the example shown there are 64 PCBs. The PCB also includes the next slices which are to be extracted from memory. With reference to the figure, slices 1 and 3 are to be removed and loaded into target port buffer 0. The information in this buffer will subsequently be transported through port 0 onto data_out line 1 (FIG. 1B). Each of the target port buffers contains 128 bytes (8 Quadwords).

Still referring to FIG. 3, in operation the transmitter controller raises requests to the memory arbiter controller requesting that the information in slice 1, buffer 1 and slice 3, buffer 1 of the memory is read and loaded into Target Port buffer 0. The EPC Read Request is also presented to the memory arbiter controller 42. Since the request by the transmitter controller requires transmission of two full buffers there is no room, during this read memory cycle, to accommodate any requests from the EPC for read action. It should be noted that since the request is for slices 1 and 3 the information can be read out simultaneously, rearranged in staging area 48 and transported out into TP buffer 0 for subsequent transmission through port 0. The information from staging area 48 is read into TP buffer 0 in correct sequential order. In summary, FIG. 3 depicts a case when the transmit controller accesses memory and utilizes the entire bandwidth. In this case the EPC does not have access to memory during this access window. The Transmitter Controller is receiving two full buffers (one from slice 1 and one from slice 3) and queueing this data into target port buffer 0 (TP 0).

For Write operation the description in FIG. 3 is equally applicable with data flow in the opposite direction to Write. As a consequence further description of the Write operation is not given.

FIG. 4 shows an example in which different buffers from the same slice are accessed and distributed to different FIFO port buffers to optimize memory access. As can be seen except for the data pattern stored in Memory 51 the structure of FIG. 4 is substantially similar to FIG. 3, previously described. Therefore, only the novel features in FIG. 4 will be discussed further. Regarding Memory 51, information is loaded into slice 1, buffer 1, Quadwords C and D; slice 1, buffer 2, Quadwords A, B, C and D; Slice 2, buffer 1, Quadwords A and D; and slice 2, buffer 3, Quadwords B, C and D. The Quadwords are identified by respective numbers. The information in the PCBs indicates data at slice 1, buffer 1 is to be loaded into TP buffer 0. Likewise, data in slice 2, buffer 1 is to be loaded into TP 1. It should be noted that additional information may be required in the PCBs in order to give complete and accurate instructions regarding moving data from memory to appropriate TP buffers. In order to make the description less complicated the additional information is omitted. But the disclosure is sufficient to enable one skilled in the art to provide the additional information.

Because the transmitter request is less than a full memory bandwidth of data (for any of the TP), full memory bandwidth Quadwords are read in each memory cycle and redistributed to the TPs.

Still referring to FIG. 4, for buffer 1 only slices C and D are requested by the transmitter controller for TP buffer 0, A and B are unused and are filled with slices 4 and 1 from buffer 2 for TP 2. Likewise, for slice 2, buffer 1, only Quadwords A and D are used by the transmitter controller for TP buffer 1. Therefore, unused Quadword B is filled with data labelled "2" from slice 2, buffer 2 and Quadword C is filled with data labelled "2" from buffer 3. The data is arranged by numbers as shown in the staging area and in the respective Target Port FIFO buffers. The movement of data from the memory 51 to respective TP buffers is indicated by appropriate single headed arrow. By way of examples arrow 52 indicates Quadwords 1 and 2 Slice 1 is sequentially arranged in TP 0; arrow 54 indicates Quadwords 1 and 2, Slice 2 are sequentially placed in TP 1; arrow 56 shows Quadwords 1 and 4, Slice 2 are sequentially placed in TP 2; arrow 58 shows Quadword 2 buffer 2, slice 2, is placed in TP 3 and arrow 60 shows Quadword 2, buffer 2 is placed in TP 4.

It should be noted that in FIG. 4 the total memory bandwidth is used in each memory cycle even though the data is distributed to different TP FIFO. (Target Port First In First Out) Buffers.

Turning to FIG. 5, the schematic demonstrates the situation wherein the memory request from the transmitter controller is less than a full memory bandwidth and the unused Quadword in Slice 2 is filled with Quadword "2", buffer 3 which is delivered via arrow 62 to the EPC in a RR (Round Robin) manner. The remaining portion of FIG. 5 is substantially similar to FIG. 4 whose previous description is applicable and incorporated by reference.

Figure 7:
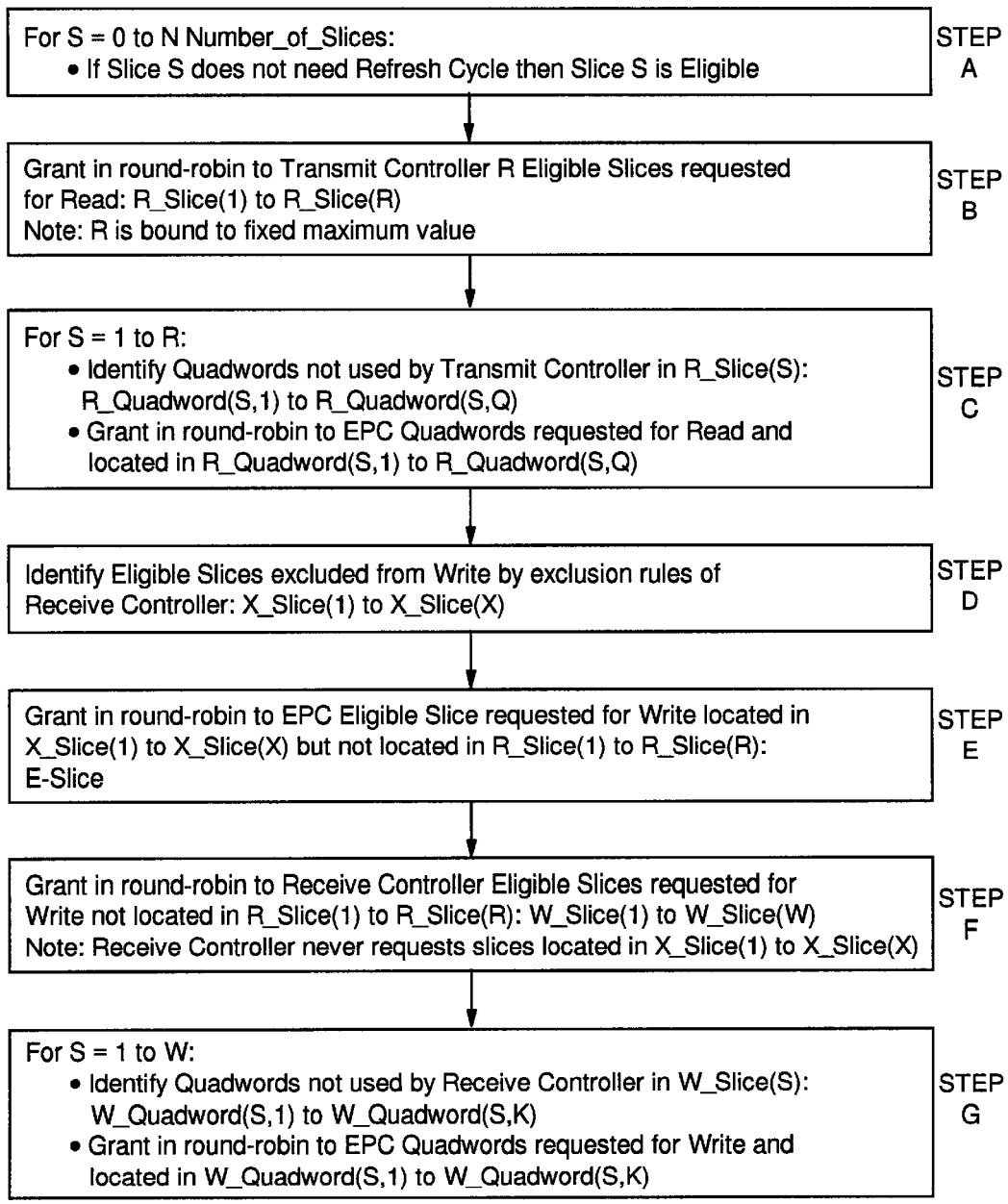
FIG. 7 shows a flowchart for the algorithm used in a Write or Read operation.

FIG. 7 shows a flowchart for the algorithm used to grant memory access to the transmitter controller, receiver controller or EPC. The algorithm includes process steps labelled Step A through Step G. Step A is a global step relating to all the slices (S=O through N, N being the total number of slices in the system for example in the present embodiment S is labelled 0 through 5). In summary, Step A determines slice eligibility for writing or reading information. If the slice does not need to be refreshed then it is eligible for assignment. Steps B and C relate to read activity performed by the transmit controller whereas Steps D through G relate to write activity performed by the receive controller. The EPC can perform either Write or Read and can be associated either with the Read routine or the Write routine.

Still referring to FIG. 7, Step B grants access to the transmit controller to read a requested number of slices R from the memory. R can be 1 through a maximum number. In the embodiment shown in this application R is set to 3. Of course other values of R can be used depending on the choice of the designer and would not deviate from the teachings of the present invention. Step C complements the Read operation by granting unused Quadword in a read request to the EPC. Stated another way, if the Read request does not use all the Quadwords then the unused ones are assigned to the EPC. The EPC can have several Read requests to go to memory. Therefore, the algorithm assigns the Read request to the EPC in a round robin fashion.

Still referring to FIG. 7, the WRITE request is controlled by steps D through G and is performed by the Receive controller or EPC. In Step D the Receive Controller is based on the principle that buffers receiving data from adjoining portions of the same frame cannot be written in the same slice. This means the adjoining information is spread across different slices of the memory. As a consequence, certain slices in memory are not eligible to be written into. In Step D the receiver controller identifies those slices that cannot be written. In Step D the slices are identified by X which can be from 1 to a max value. In Step E the algorithm grants to the EPC eligible slice requested for Write located in the X slices identified in Step D but not located in Step B. In Step E, X represents the slices excluded in Step D while R represents slices used for reading in Step B.

In Step F the algorithm grants in a round robin fashion the slice requested by the receive controller. The round robin assignment is necessary because the Receive controller can request N number of slices where N is greater than 1. It should be noted that the Receive controller will not ask for slices that are excluded in Step D. In addition, the slices granted to the Receive controller are those not granted for Read (R). In Step G the Quadwords which are not used by the Receive controller for writing is granted to the EPC. The grant is done in a round robin fashion because the EPC can make multiple Write requests.

Many other variations of embodiments and implementations of the present invention are possible without departing from the principles disclosed herein. While various embodiments of the present invention have been described above it should be understood that they have been presented by way of example only and not a limitation. Thus, the breadth and scope of the present invention should not be limited by any of the above described exemplary embodiments but should be defined only in accordance with the following claims and their equivalents.

What is claimed is:

1. A method to optimize utilization of memory comprising the acts of:
   a) providing the memory having multiple buffers arranged in at least one slice and each buffer in said at least one slice partitioned into multiple Quadwords;
   b) accepting in a memory arbiter multiple memory requests seeking access to the at least one slice from multiple requesters;
   c) assigning a predetermined priority by said memory arbiter to each one of the requests;
   d) analyzing by said memory arbiter the highest priority request to detect percentage of memory bandwidth required for said highest priority request; and
   e) sharing memory access with a lower priority request if the highest priority request does not utilize full memory bandwidth.

2. A method to optimize utilization of memory comprising the acts of:
   a) providing the memory having multiple buffers arranged in at least one slice and each buffer in said at least one slice partitioned into multiple Quadwords;
   b) accepting in a memory arbiter multiple memory requests seeking access to the at least one slice from multiple requesters;
   c) assigning a predetermined priority by said memory arbiter to each one of the requests; and
   d) analyzing by said memory arbiter the highest priority request to detect percentage of memory bandwidth required for said highest priority request; and
   e) permitting the highest priority request to utilize full memory bandwidth if said highest priority request requires full memory bandwidth or sharing the memory bandwidth with lower lower request if said highest priority request demand less than full memory bandwidth.

3. The method of claim 2 wherein the multiple requesters includes a receiver controller, transmitter controller and Embedded Processor Complex (EPC) Controller operably coupled within a Network Processor.

4. The method of claim 3 wherein the transmitter controller has the highest priority.

5. The method of claim 4 wherein the receiver controller has next highest priority.

6. The method of claim 5 wherein the EPC shared memory bandwidth with the transmitter controller or the receiver controller.

7. The method of claim 3 wherein the request includes read and write.

8. The method of claim 7 wherein the read request is generated by the transmitter controller.

9. The method of claim 8 wherein the write request is provided by the receiver controller.

10. The method of claim 9 wherein read and write requests are provided by the EPC controller.

11. A method for optimizing memory utilization comprising the acts of:
   receiving in a memory arbiter a plurality of memory access requests;
   providing in said memory arbiter a priority designation for at least one of the memory access requests;
   analyzing by said memory arbiter the memory access requests having the priority designation to determine magnitude of memory bandwidth required; and
   permitting the memory access request having the priority designation to utilize full memory bandwidth if said memory request with the priority designation requires full memory bandwidth or sharing the memory bandwidth with other requests if said memory access request having the priority designation demands less than full memory bandwidth.

12. The method of claim 11 wherein the priority designation is the highest.

13. The method of claim 11 wherein sharing further includes combining memory bandwidth of the highest priority request with memory bandwidth of lower priority request.

14. A network processor includes:
   a memory system that stores information; and
   a memory arbiter that grants access operatively coupled to said memory system; said memory arbiter including one or more request registers in which memory access requests are received, at least one priority register that stores priority designation for the requesters and a controller operatively coupled to the request registers and priority register said controller including circuits that monitors requests and request priorities to generate memory access vectors in which the highest priority request is allowed utilization of full memory bandwidth if said highest priority request so demands or generate memory access request in which the highest priority request and a lower priority request share the full memory bandwidth.

15. The network processor of claim 14 wherein the memory system includes a plurality of buffers arranged in at least one slice, and each buffer is partitioned into Quadwords.

16. The network processor of claim 15 wherein each slice is operatively coupled to at least one buffer controller.

17. The network processor of claim 16 wherein each buffer is 64 bytes partitioned into four Quadwords of 16 bytes each.

18. The network processor of claim 15 wherein each slice is fabricated from DDR DRAM.

19. The network processor of claim 14 further including a receiver controller operatively coupled to the memory arbiter.

20. The network processor of claim 19 further including a transmitter controller operatively coupled to said memory arbiter.

21. The network processor of claim 20 further including embedded processor complex, EPC, operatively coupled to the memory arbiter.

22. The network processor of claim 21 further including a scheduler operatively coupled to the transmitter controller.

23. The network processor of claim 14 wherein the controller selectively performs following selection algorithm to construct buffer memory access vector:

a) Exclude slices scheduled to re-fresh cycle (indicated by each DRAM controller);

b) Assign slices for all R (Read) requests of Transmitter Controller;

c) Complement R—accesses from corresponding EPC queue [Slice; Quadword];

d) Assign slice to EPC for globally W (Write) excluded slices (e.g. slice is excluded by all slice exclusion rules from Receiver);

e) Assign slices to W requests in RR (Round Robin) fashion between non-excluded slices starting from last assigned slice (slice assigned to Receiver Controller in previous window);

f) Complement W—accesses from corresponding EPC queue [Slice; Quadword]; and

Assign slice to EPC request according to priority expressed by Weight.

24. Apparatus comprising:
   a memory partitioned into N sectors, N greater than 1; and
   a memory arbiter controller operatively coupled to said memory: said memory arbiter controller receiving at least two memory access requests, assigning memory access priority for said requests, analyzing a selected one of said requests to determine if said selected one of said memory requests will use full memory bandwidth for a particular memory access cycle, generating a memory access vector which assigns full memory bandwidth to the selected one of said requests if full memory bandwidth was requested and sharing memory bandwidth with another request if the full memory bandwidth was not used.

25. A method to access memory comprising the acts of:
a) receiving in a memory arbiter Read Requests from a first Requester, said Read Request including information identifying a portion of the memory from which data is to be read;
b) determining if data to be returned used all of the available memory bandwidth; and
c) complementing the data to be returned for the first requester with data for a second requester if the full memory bandwidth is not used by the first requester.

26. A method comprising the acts of:
a) receiving in an arbiter a request from a first requester seeking access to memory;
b) determining what portion of memory bandwidth is to be used as a result of said request;
c) assigning usage of the total memory bandwidth to the first Requester if the determination in act b) indicates full usage of the memory bandwidth;
d) complementing the bandwidth usage of the first Requester with bandwidth usage requested by a second Requester if determination in act b) indicates the bandwidth usage of the first Requester is less than full memory bandwidth.

27. The method of claim 26 wherein the first Requester includes a Transmit Controller.

28. The method of claim 27 wherein the request includes a Read Request.

29. The method of claim 28 wherein the second requester includes EPC (Embedded Processor Complex).

30. The method of claim 26 wherein the first Requester includes Receiver Controller.

31. The method of claim 30 wherein the request includes a Write Request.

* * * * *